(12) United States Patent
Adam et al.

(10) Patent No.: US 9,430,664 B2
(45) Date of Patent: Aug. 30, 2016

(54) DATA PROTECTION FOR ORGANIZATIONS ON COMPUTING DEVICES

(71) Applicant: Microsoft Technology Licensing, LLC, Redmond, WA (US)

(72) Inventors: Preston Derek Adam, Woodinville, WA (US); Peter J. Novotney, Seattle, WA (US); Nathan J. Ide, Bothell, WA (US); Innokentiy Basmov, Redmond, WA (US); Narendra S. Acharya, Kirkland, WA (US); Octavian T. Ureche, Bellevue, WA (US); Saurav Sinha, Bellevue, WA (US); Gopinathan Kannan, Redmond, WA (US); Christopher R. Macaulay, Seattle, WA (US); Michael J. Grass, Kenmore, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 412 days.

(21) Appl. No.: 13/933,928

(22) Filed: Jul. 2, 2013

(65) Prior Publication Data
US 2014/0344571 A1 Nov. 20, 2014

Related U.S. Application Data

(63) Continuation of application No. 13/898,368, filed on May 20, 2013.

(51) Int. Cl.
*G06F 21/62* (2013.01)
*H04L 29/06* (2006.01)

(52) U.S. Cl.
CPC ....... *G06F 21/6218* (2013.01); *H04L 63/0428* (2013.01); *G06F 2221/2143* (2013.01)

(58) Field of Classification Search
CPC .............. G06F 21/6218; G06F 21/24; G06F 2221/2143; G06F 15/16; G06F 2221/2113; H04L 63/0428
See application file for complete search history.

(56) References Cited

U.S. PATENT DOCUMENTS

| 5,495,533 A | 2/1996 | Linehan et al. |
| 5,897,661 A | 4/1999 | Baranovsky et al. |

(Continued)

FOREIGN PATENT DOCUMENTS

| CN | 1653422 | 8/2005 |
| CN | 102646077 | 8/2012 |

(Continued)

OTHER PUBLICATIONS

"Blackberry 10", Retrieved from <http://en.wikipedia.org/wiki/BlackBerry_10#BlackBerry_Balance> on Apr. 2, 2013, (Apr. 1, 2013), 8 pages.

(Continued)

*Primary Examiner* — Matthew Smithers
(74) *Attorney, Agent, or Firm* — Timothy Churna; Judy Yee; Micky Minhas

(57) ABSTRACT

An application on a device can communicate with organization services. The application accesses a protection system on the device, which encrypts data obtained by the application from an organization service using an encryption key, and includes with the data an indication of a decryption key usable to decrypt the encrypted data. The protection system maintains a record of the encryption and decryption keys associated with the organization. The data can be stored in various locations on at least the device, and can be read by various applications on at least the device. If the organization determines that data of the organization stored on a device is to no longer be accessible on the device (e.g., is to be revoked from the device), a command is communicated to the device to revoke data associated with the organization. In response to this command, the protection system deletes the decryption key.

20 Claims, 6 Drawing Sheets

(56) References Cited

U.S. PATENT DOCUMENTS

| | | |
|---|---|---|
| 5,966,263 A | 10/1999 | Freitas et al. |
| 6,016,402 A | 1/2000 | Thomas et al. |
| 6,028,725 A | 2/2000 | Blumenau |
| 6,041,386 A | 3/2000 | Bello |
| 6,067,199 A | 5/2000 | Blumenau |
| 6,076,143 A | 6/2000 | Blumenau |
| 6,134,062 A | 10/2000 | Blumenau |
| 6,151,665 A | 11/2000 | Blumenau |
| 6,170,037 B1 | 1/2001 | Blumenau |
| 6,170,055 B1 | 1/2001 | Meyer et al. |
| 6,253,300 B1 | 6/2001 | Lawrence et al. |
| 6,292,317 B1 | 9/2001 | Alexander |
| 6,292,790 B1 | 9/2001 | Krahn et al. |
| 6,665,784 B2 | 12/2003 | Ihde et al. |
| 6,727,896 B2 | 4/2004 | Tsang |
| 6,728,379 B1 | 4/2004 | Ishibashi et al. |
| 6,789,162 B1 | 9/2004 | Talagala et al. |
| 6,944,742 B1 | 9/2005 | Shoff et al. |
| 6,968,973 B2 | 11/2005 | Uyttendaele et al. |
| 6,996,696 B2 | 2/2006 | Shoff et al. |
| 7,356,662 B2 | 4/2008 | Shoff et al. |
| 7,360,073 B1 | 4/2008 | Billstrom et al. |
| 7,380,140 B1 | 5/2008 | Weissman et al. |
| 7,382,883 B2 | 6/2008 | Cross et al. |
| 7,409,623 B2 | 8/2008 | Baker et al. |
| 7,451,484 B1 | 11/2008 | Nadalin et al. |
| 7,536,536 B1 | 5/2009 | Joshi et al. |
| 7,559,088 B2 | 7/2009 | Cohen et al. |
| 7,580,950 B2 | 8/2009 | Kavuri et al. |
| 7,594,087 B2 | 9/2009 | Zeevi et al. |
| 7,646,380 B2 | 1/2010 | Tsang |
| 7,694,134 B2 | 4/2010 | Witt et al. |
| 7,711,923 B2 | 5/2010 | Rogers et al. |
| 7,725,703 B2 | 5/2010 | Hunter et al. |
| 7,757,100 B2 | 7/2010 | Weissman et al. |
| 7,849,254 B2 | 12/2010 | Ash et al. |
| 7,890,664 B1 | 2/2011 | Tao et al. |
| 7,903,549 B2 | 3/2011 | Judge et al. |
| 7,930,540 B2 | 4/2011 | Ahuja et al. |
| 7,962,739 B2 | 6/2011 | Childs et al. |
| 7,979,626 B2 | 7/2011 | Rogers et al. |
| 8,046,365 B2 | 10/2011 | Saito |
| 8,046,533 B2 | 10/2011 | Kompella et al. |
| 8,085,933 B2 | 12/2011 | Ferguson |
| 8,214,656 B1 | 7/2012 | Plotkin et al. |
| 8,234,477 B2 | 7/2012 | Shaath |
| 8,249,257 B2 | 8/2012 | Brutch et al. |
| 8,321,688 B2 | 11/2012 | Auradkar et al. |
| 8,341,427 B2 | 12/2012 | Auradkar et al. |
| 8,341,430 B2 | 12/2012 | Ureche et al. |
| 8,387,109 B2 | 2/2013 | Ureche et al. |
| 8,411,863 B2 | 4/2013 | Ureche et al. |
| 8,416,954 B1 | 4/2013 | Raizen et al. |
| 8,417,973 B2 | 4/2013 | Cooper et al. |
| 8,423,792 B2 | 4/2013 | Luciani et al. |
| 8,458,490 B2 | 6/2013 | Konetski et al. |
| 8,527,561 B1 | 9/2013 | Moody, II et al. |
| 8,538,919 B1 | 9/2013 | Nielsen et al. |
| 8,549,271 B1 | 10/2013 | Joshi et al. |
| 8,583,879 B2 | 11/2013 | Na et al. |
| 8,588,422 B2 | 11/2013 | Beachem et al. |
| 8,625,802 B2 | 1/2014 | Parann-Nissany |
| 8,661,193 B1 | 2/2014 | Cobos et al. |
| 8,667,213 B2 | 3/2014 | Rogers et al. |
| 8,689,279 B2 | 4/2014 | Basmov et al. |
| 8,726,407 B2 | 5/2014 | Etchegoyen |
| 8,769,305 B2 | 7/2014 | Blaisdell |
| 8,874,935 B2 | 10/2014 | Basmov et al. |
| 8,875,304 B2 | 10/2014 | Celi, Jr. et al. |
| 2003/0084298 A1 | 5/2003 | Messerges et al. |
| 2003/0196114 A1 | 10/2003 | Brew et al. |
| 2003/0221095 A1 | 11/2003 | Gaunt et al. |
| 2004/0174345 A1 | 9/2004 | Tsang |
| 2005/0071280 A1 | 3/2005 | Irwin et al. |
| 2005/0213377 A1 | 9/2005 | Shoff et al. |
| 2005/0262361 A1 | 11/2005 | Thibadeau |
| 2005/0265074 A1 | 12/2005 | Shoff et al. |
| 2005/0283730 A1 | 12/2005 | Uyttendaele et al. |
| 2006/0101027 A1 | 5/2006 | Hotchkiss |
| 2006/0155919 A1 | 7/2006 | Lasser et al. |
| 2006/0190984 A1 | 8/2006 | Heard et al. |
| 2006/0206507 A1 | 9/2006 | Dahbour |
| 2006/0277590 A1 | 12/2006 | Limont et al. |
| 2006/0279556 A1 | 12/2006 | Tsang |
| 2007/0028231 A1 | 2/2007 | Kelso et al. |
| 2007/0058806 A1 | 3/2007 | Ferguson |
| 2007/0150886 A1 | 6/2007 | Shapiro |
| 2007/0244940 A1 | 10/2007 | Devarakonda et al. |
| 2007/0250678 A1 | 10/2007 | Ueoka et al. |
| 2007/0300008 A1 | 12/2007 | Rogers et al. |
| 2007/0300037 A1 | 12/2007 | Rogers et al. |
| 2008/0002830 A1 | 1/2008 | Cherkasov et al. |
| 2008/0005467 A1 | 1/2008 | Morley et al. |
| 2008/0083036 A1 | 4/2008 | Ozzie et al. |
| 2008/0107262 A1 | 5/2008 | Helfman et al. |
| 2008/0130156 A1 | 6/2008 | Chu et al. |
| 2008/0141040 A1 | 6/2008 | Biddle et al. |
| 2008/0155316 A1 | 6/2008 | Pawar et al. |
| 2008/0168315 A1 | 7/2008 | Mead et al. |
| 2008/0229428 A1 | 9/2008 | Camiel |
| 2008/0240441 A1 | 10/2008 | Kawakami |
| 2008/0263371 A1 | 10/2008 | Weissman et al. |
| 2008/0301470 A1 | 12/2008 | Green et al. |
| 2009/0024795 A1 | 1/2009 | Kobara |
| 2009/0063756 A1 | 3/2009 | Asipov |
| 2009/0075630 A1 | 3/2009 | McLean |
| 2009/0132474 A1 | 5/2009 | Ma et al. |
| 2009/0205012 A1 | 8/2009 | Jain et al. |
| 2009/0210267 A1 | 8/2009 | Fish et al. |
| 2009/0287874 A1 | 11/2009 | Rogers et al. |
| 2009/0307563 A1 | 12/2009 | Marquez et al. |
| 2010/0100721 A1 | 4/2010 | Su et al. |
| 2010/0107213 A1 | 4/2010 | Ureche et al. |
| 2010/0169948 A1 | 7/2010 | Budko et al. |
| 2010/0250847 A1 | 9/2010 | Chen |
| 2010/0266132 A1 | 10/2010 | Bablani et al. |
| 2010/0299152 A1 | 11/2010 | Batchu et al. |
| 2010/0306175 A1 | 12/2010 | Johnson et al. |
| 2010/0332725 A1 | 12/2010 | Post et al. |
| 2011/0010560 A1 | 1/2011 | Etchegoyen |
| 2011/0035577 A1 | 2/2011 | Lin et al. |
| 2011/0055559 A1 | 3/2011 | Li et al. |
| 2011/0060915 A1 | 3/2011 | Tal |
| 2011/0078760 A1 | 3/2011 | De Perthuis |
| 2011/0087890 A1 | 4/2011 | Munsil et al. |
| 2011/0154023 A1 | 6/2011 | Smith et al. |
| 2011/0202916 A1 | 8/2011 | VoBa et al. |
| 2011/0246785 A1 | 10/2011 | Linsley et al. |
| 2011/0247047 A1 | 10/2011 | Loureiro et al. |
| 2011/0252232 A1 | 10/2011 | De Atley et al. |
| 2011/0264925 A1 | 10/2011 | Russo et al. |
| 2011/0276683 A1 | 11/2011 | Goldschlag et al. |
| 2011/0277013 A1 | 11/2011 | Chinta |
| 2012/0017095 A1 | 1/2012 | Blenkhorn et al. |
| 2012/0036347 A1 | 2/2012 | Swanson et al. |
| 2012/0036370 A1 | 2/2012 | Lim et al. |
| 2012/0079603 A1 | 3/2012 | Brown et al. |
| 2012/0087033 A1 | 4/2012 | Yang |
| 2012/0110345 A1* | 5/2012 | Pigeon ............... H04L 63/0435 713/189 |
| 2012/0173882 A1 | 7/2012 | Horn et al. |
| 2012/0239618 A1 | 9/2012 | Kung |
| 2012/0297190 A1 | 11/2012 | Shen et al. |
| 2012/0331550 A1 | 12/2012 | Raj et al. |
| 2013/0013856 A1 | 1/2013 | Rogers et al. |
| 2013/0054977 A1 | 2/2013 | Basmov |
| 2013/0054979 A1 | 2/2013 | Basmov |
| 2013/0067242 A1 | 3/2013 | Lyakhovitskiy et al. |
| 2013/0074142 A1 | 3/2013 | Brennan et al. |
| 2013/0086691 A1 | 4/2013 | Fielder |
| 2013/0117561 A1 | 5/2013 | Chawla et al. |
| 2013/0117805 A1 | 5/2013 | Kent et al. |
| 2013/0138971 A1 | 5/2013 | Budko et al. |
| 2013/0198474 A1 | 8/2013 | Shaath |

(56) References Cited

U.S. PATENT DOCUMENTS

| | | |
|---|---|---|
| 2013/0208893 A1 | 8/2013 | Shablygin et al. |
| 2013/0291055 A1 | 10/2013 | Muppidi et al. |
| 2013/0318359 A1 | 11/2013 | Morris et al. |
| 2014/0007182 A1 | 1/2014 | Qureshi et al. |
| 2014/0007222 A1* | 1/2014 | Qureshi .................. G06F 21/10 726/16 |
| 2014/0019753 A1 | 1/2014 | Lowry et al. |
| 2014/0032691 A1 | 1/2014 | Barton et al. |
| 2014/0032759 A1 | 1/2014 | Barton et al. |
| 2014/0032933 A1 | 1/2014 | Smith et al. |
| 2014/0059690 A1 | 2/2014 | Li et al. |
| 2014/0081980 A1 | 3/2014 | Aad |
| 2014/0156705 A1 | 6/2014 | Beecham et al. |
| 2014/0156706 A1 | 6/2014 | Beecham et al. |
| 2014/0164774 A1 | 6/2014 | Nord et al. |
| 2014/0181512 A1 | 6/2014 | Spalka et al. |
| 2014/0230007 A1 | 8/2014 | Roth et al. |
| 2014/0344570 A1 | 11/2014 | Adam et al. |
| 2015/0033039 A1 | 1/2015 | Basmov et al. |
| 2015/0186657 A1 | 7/2015 | Nakhjiri |
| 2015/0270956 A1 | 9/2015 | Basmov et al. |
| 2015/0278531 A1 | 10/2015 | Smith et al. |
| 2016/0072796 A1 | 3/2016 | Adam et al. |
| 2016/0080149 A1 | 3/2016 | Mehta et al. |
| 2016/0127327 A1 | 5/2016 | Mehta |

FOREIGN PATENT DOCUMENTS

| | | |
|---|---|---|
| CN | 103092664 | 5/2013 |
| CN | 103092938 | 5/2013 |
| CN | 103500116 | 1/2014 |
| CN | 103577567 | 2/2014 |
| EP | 2393033 | 12/2011 |
| EP | 2448303 A1 | 5/2012 |
| EP | 2509275 | 10/2012 |
| EP | 2562675 | 2/2013 |
| EP | 2680487 | 1/2014 |
| TW | 200519595 | 6/2005 |
| TW | 200723093 | 6/2007 |
| TW | 201032559 | 9/2010 |
| WO | WO-0049488 | 8/2000 |
| WO | WO-2004034184 | 4/2004 |
| WO | WO-2004107646 | 12/2004 |
| WO | WO-2009069043 | 6/2009 |
| WO | WO-2009149019 | 12/2009 |
| WO | WO-2012016091 | 2/2012 |
| WO | WO-2012167392 | 12/2012 |

OTHER PUBLICATIONS

"Divide: The Next Generation of Enterprise Mobility", Retrieved at <<http://www.divide.com/download/Divide_Product_Sheet_1116.pdf<< on May 8, 2013, (Jan. 20, 2013), 2 pages.
"Exchange ActiveSync", Retrieved from <http://en.wikipedia.org/wiki/Exchange_ActiveSync> on Apr. 1, 2013, 5 pages.
"Exchange ActiveSync: Provisioning Protocol", Retrieved from <http://msdn.microsoft.com/en-us/library/dd299443(v=EXCHG.80).aspx> on Apr. 1, 2013, (Dec. 3, 2008), 4 Pages.
"Mobile Device Management", Retrieved from <http://www.bing.com/search?q=mobile+device+management&src=IE-TopResult&FORM=IE10TR> on Apr. 2, 2013, (2013), 2 pages.
"MobileIron Introduces the First Complete Mobile App Persona for the Enterprise", Retrieved from <http://www.mobileiron.com/en/company/press-room/press-releases/371-mobileiron-introduces-the-first-complete-mobile-app-persona-for-the-enterprise> on Mar. 25, 2013, (Nov. 6, 2012), 2 pages.
"OMA Device Management", Retrieved from <http://en.wikipedia.org/wiki/OMA_DM> on Apr. 2, 2013, (Mar. 25, 2013), 4 Pages.
"OMA Device Management", Retrieved from <http://msdn.microsoft.com/en-us/library/bb737369.aspx>, (Aug. 4, 2010), 4 Pages.
"ThoriumCloud Enterprise Container", Retrieved from <http://www.thoriumcloud.com/> on Mar. 25, 2013, (2013), 4 Pages.
Mitchell, Jason "What is a Selective Wipe?", Retrieved from <http://www.landesk.com/blog/what-is-a-selective-wipe/> on Mar. 25, 2013, (Apr. 30, 2012), 1 page.
Pecherle, et al., "Data Wiping System with Fully Automated, Hidden and Remote Destruction Capabilities", *In Journal of WSEAS Transactions on Computers*, vol. 9, Issue 9, Available at <http://www.wseas.us/e-library/transactions/computers/2010/88-110.pdf>,(Sep. 2010), pp. 939-948.
Stehle, Matt "Provisioning, Policies, Remote Wipe, and the Allow/Block/Quarantine list in Exchange ActiveSync", Retrieved from <http://msdn.microsoft.com/en-us/library/exchande/hh509085(v=exchg.140).aspx> on Apr. 1, 2013, (2013), 20 pages.
Stockton, Benjamin "Divide and your Data: Privacy, Sync, Backup, Restore, Storage and Wipe", Retrieved from <http://support.divide.com/entries/20964987-Divide-and-your-data-privacy-sync-backup-restore-storage-and-wipe> on Mar. 25, 2013, (Feb. 8, 2012), 2 pages.
"Adobe AIR 1.5 Applications with Flex-Storing Encrypted Data", Retrieved From: <http://help.adobe.com/en_US/AIR/1.5/devappsflex/WS5b3ccc516d4fbf351e63e3d118666ade46-7e31.html> May 1, 2015, Oct. 19, 2012, 2 pages.
"Final Office Action", U.S. Appl. No. 13/898,368, Apr. 16, 2015, 16 pages.
"How Do I Prevent 'Sensitive Data Exposure'?", Retrieved From: <https://www.owasp.org/index.php/Top_10_2013-A6-Sensitive_Data_Exposure> May 12, 2015, Jun. 23, 2013, 2 pages.
"InnoSetup Help", Retrieved From: <http://www.jrsoftware.org/ishelp/index.php?topic=filessection> May 12, 2015, 8 pages.
"What Android Sync'd Data is Encrypted?", Retrieved From: <http://android.stackexchange.com/questions/3129/what-android-syncd-data-is-encrypted>, Nov. 25, 2010, 3 pages.
"Windows Selective Wipe for Device Data Management", Retrieved from <http://technet.microsoft.com/en-us/library/dn486874.aspx>, Nov. 1, 2013, 4 pages.
Becher,"Mobile Security Catching Up? Revealing the Nuts and Bolts of the Security of Mobile Devices", Proceedings of IEEE Symposium on Security and Privacy, May 22, 2011, pp. 96-111.
Bugiel,"Practical and Lightweight Domain Isolation on Android", Proceedings of the 1st ACM Workshop on Security and privacy in Smartphones and Mobile Devices, Oct. 17, 2011, 12 pages.
Gudeth,"Delivering Secure Applications on Commercial Mobile Devices: The Case for Bare Metal Hypervisors", Proceedings of the 1st ACM Workshop on Security and privacy in Smartphones and Mobile Devices, Oct. 17, 2011, pp. 33-38.
Li,"Scalable and Secure Sharing of Personal Health Records in Cloud Computing Using Attribute-Based Encryption", IEEE Transactions on Parallel and Distributed Systems, vol. 24, Issue 1, Jan. 2013, pp. 131-143.
Oberheide,"When Mobile is Harder Than Fixed (and Vice Versa): Demystifying Security Challenges in Mobile Environments", Proceedings of Eleventh International Workshop on Mobile Computing Systems and Applications, Feb. 22, 2010, 6 pages.
Pisko,"Trusted Computing in Mobile Platforms—Players, Usage Scenarios, and Interests", Proceedings of Privacy and Security, Sep. 2005, pp. 526-530.
Purdy,"Thumb Drive", Retrieved From: <http://lifehacker.com/5583307/top-10-usb-thumb-drive-tricks-2010-edition> May 12, 2015, Oct. 7, 2010, 6 pages.
Reardon,"Secure Deletion on Log-structured File Systems", In Proceedings: Technical Report, Department of Computer Science, ETH Zurich Available at: <http://arxiv.org/pdf/1106.0917.pdf>, Jun. 5, 2011, 11 pages.
"About EFS (Encrypting File System)", Available at: https://www.elcomsoft.com/help/en/aefsdr/about_efs.html, Oct. 28, 2014, 3 pages.
"Application Encryption-Vormetric Data Security Products", Available at: http://www.vormetric.com/products/vormetric-application-encryption, Jun. 27, 2014, 6 pages.
"Approaches for Encryption of Data at Rest in the Enterprise", In White Papers, 2008, 24 pages.

(56) References Cited

OTHER PUBLICATIONS

"BitLocker Drive Encryption in Windows Vista", Microsoft TechNet, retrieved from <http://technet.microsoft.com/en-us/library/cc725719(WS.10).aspx> on Apr. 25, 2011, Aug. 6, 2010, 9 pages.
"CheckVision Enterprise Encryption", Available at: http://assets1.csc.com/banking/downloads/CardsPayments_CheckVisionEnterprise_DS.pdf, Apr. 24, 2013, 2 pages.
"DataStax Enterprise 3.2", Available at: http://docs.datastax.com/en/datastax_enterprise/3.2/datastax_enterprise/sec/secTDE.html—Retrieved on: Jul. 23, 2015, 2 pages.
"Extended European Search Report", EP Application No. 11871440.1, Mar. 16, 2015, 5 pages.
"Extended European Search Report", EP Application No. 11871825.3, May 11, 2015, 7 pages.
"Final Office Action", U.S. Appl. No. 13/221,629, Dec. 23, 2013, 24 pages.
"Foreign Notice of Allowance", CN Application No. 201210314631.1, Aug. 20, 2015, 4 pages.
"Foreign Notice of Allowance", CN Application No. 201210314748.X, Jul. 3, 2015, 3 pages.
"Foreign Office Action", CN Application No. 201210314631.1, Dec. 1, 2014, 14 pages.
"Foreign Office Action", CN Application No. 201210314748.X, Mar. 17, 2015, 7 pages.
"Foreign Office Action", CN Application No. 201210314748.X, Sep. 23, 2014, 14 Pages.
"International Search Report and Written Opinion", Application No. PCT/US2015/021125, Jul. 3, 2015, 9 Pages.
"International Search Report and Written Opinion", Application No. PCT/US2011/055600, Jul. 30, 2012, 9 pages.
"International Search Report and Written Opinion", Application No. PCT/US2011/055626, Sep. 19, 2012, 9 pages.
"Non-Final Office Action", U.S. Appl. No. 13/221,629, May 17, 2013, 27 pages.
"Non-Final Office Action", U.S. Appl. No. 13/221,699, Apr. 1, 2013, 16 pages.
"Non-Final Office Action", U.S. Appl. No. 13/898,368, Aug. 4, 2015, 17 pages.
"Non-Final Office Action", U.S. Appl. No. 14/221,105, Aug. 4, 2015, 25 pages.
"Non-Final Office Action", U.S. Appl. No. 14/506,167, Jun. 29, 2015, 16 pages.
"Notice of Allowance", U.S. Appl. No. 13/221,629, Jun. 27, 2014, 16 pages.
"Notice of Allowance", U.S. Appl. No. 13/221,699, Oct. 30, 2013, 9 pages.
"Oracle Advanced Security", Available at: http://www.oracle.com/technetwork/database/security/ds-advanced-security-tde-psft-129631.pdf, Apr. 16, 2011, 2 pages.
"Search Report", TW Application No. 100136565, Aug. 3, 2015, 1 pages.
"Security Solutions and Services", retrieved from <http://www.csc.com/public_sector/offerings/11043/17449-security_solutions_and_services> on Apr. 26, 2011, 2 pages.
"Transparent Data Encryption (TDE)", Available at: https://msdn.microsoft.com/en-in/library/bb934049.aspx—Retrieved on: Jul. 23, 2015, 11 pages.
"Unlock BitLocker under Windows PC", Retrieved from: <http://windows7migration.info/index.phpoption=com_content&view=article&id=1836:unlock-bitlocker-under-windows-pe&catid=42:4sysops&Itemid=61> on Aug. 4, 2011, 5 pages.
Adam,"Enterprise Data Protection: Building Universal Windows Apps That Keep Work and Personal Data Separate and Secure", Available at: https://mix.office.com/watch/fd0jojbqv6qx—Retrieved on: Jul. 23, 2015, 20 pages.
Kalogeropoulos,"Oracle Data Pump Encrypted Dump File Support", In Oracle White Paper, Jul. 2011, 15 pages.

Lane,"Cracking the Confusion: Encryption Layers", Available at: https://securosis.com/blog/cracking-the-confusion-encryption-layers, Feb. 12, 2015, 2 pages.
Lawson,"Meeting Regulatory Compliance Challenges with Data Management Tools Solutions", YL & A, www.ylassoc.com, available at <ftp://public.dhe.ibm.com/software/data/db2imstools/solutions/lawson-reg-compliance.pdf>, Sep. 19, 2006, pp. 1-18.
Li,"Managing Data Retention Policies at Scale", IFIP/IEEE International Symposium on Integrated Network Management 2011, Dublin, Ireland, May 23-27, 2011., available at <http://www.hpl.hp.com/techreports/2010/HPL-2010-203.pdf>, Dec. 21, 2010, 9 pages.
Magnabosco,"Transparent Data Encryption", Available at: https://www.simple-talk.com/sql/database-administration/transparent-data-encryption/, Mar. 16, 2010, 19 pages.
Mont,"A Systemic Approach to Privacy Enforcement and Policy Compliance Checking in Enterprises", Trusted Systems Laboratory, HP Laboratories Bristol, HPL-2006-44, available at <http://www.hpl.hp.com/techreports/2006/HPL-2006-44.pdf>, Mar. 16, 2006, 11 pages.
Toegl,"acTvSM: A Dynamic Virtualization Platform for Enforcement of Application Integrity", Lecture Notes in Computer Science vol. 6802, 2011, Retrieved from <https://online.tugraz.at/tug_online/voe_main2.getvolltext?pCurrPk=60165>, 2011, 20 pages.
Wahl,"Oracle Advanced Security Transparent Data Encryption Best Practices", In Oracle White Paper, Jul. 2012, 29 pages.
"Non-Final Office Action issued in U.S. Appl. No. 13/898,368", Mailed Date: Dec. 8, 2014, 13 Pages.
"International Search Report & Written Opinion for PCT Application No. PCT/US2013/061053", Mailed Date: Jan. 30, 2014, Filed Date: Sep. 20, 2013, 10 Pages.
"How Can We Ensure Data Security on Mobile Devices??", Retrieved From: <http://enterprise.huawei.com/topic/byod_en/solution_byod_info_3.html> Mar. 6, 2014, Jun. 16, 2013, 4 pages.
"Securing end-user mobile devices in the enterprise", In Proceedings: Thought Leadership White Paper, Jan. 30, 2014, 10 pages.
"Various Mobile Device Management (MDM) Solutions" Retrieved From: <http://www.bing.com/search?q=mobile+device+management&src=IE-TopResult&FORM=IE10TR> Mar. 5, 2014, 2 pages.
Zeis, Adam, "The security of BlackBerry Balance", Retrieved From: <http://crackberry.com/security-blackberry-balance> Mar. 6, 2014, Aug. 2, 2013, 13 pages.
"Final Office Action", U.S. Appl. No. 14/221,105, Feb. 22, 2016, 35 pages.
"International Preliminary Report on Patentability", Application No. PCT/US2013/061053, Nov. 24, 2015, 8 pages.
"International Search Report and Written Opinion", Application No. PCT/US2015/058707, Jan. 20, 2016, 11 Pages.
"Final Office Action", U.S. Appl. No. 13/898,368, Dec. 2, 2015, 19 pages.
"Foreign Office Action", TW Application No. 100136564, Oct. 20, 2015, 11 pages.
"International Search Report and Written Opinion", Application No. PCT/US2015/049981, Dec. 3, 2015, 11 pages.
"Non-Final Office Action", U.S. Appl. No. 14/489,288, Nov. 6, 2015, 25 pages.
Menezes,"Handbook of Applied Cryptography", CRC Press LLC,, Jan. 1, 1997, pp. 25-27 & 551-553.
Advisory Action, U.S. Appl. No. 14/506,167, Apr. 13, 2016, 3 pages.
Foreign Notice of Allowance, TW Application No. 100136564, Feb. 25, 2016, 4 pages.
Foreign Notice of Allowance, TW Application No. 100136565, Mar. 25, 2016, 4 pages.
International Search Report and Written Opinion, Application No. PCT/US2015/048750, Apr. 11, 2016, 22 pages.
Non-Final Office Action, U.S. Appl. No. 14/533,921, Apr. 19, 2016, 18 pages.

\* cited by examiner

DATA PROTECTION FOR ORGANIZATIONS ON COMPUTING DEVICES

RELATED APPLICATIONS

This application is a continuation of U.S. patent application Ser. No. 13/898,368, filed May 20, 2013, entitled "Data Protection for Organizations on Computing Devices", the entire disclosure of which is hereby incorporated by reference herein in its entirety.

BACKGROUND

As computing technology has advanced, many different types of computing devices have become commonplace. Portable computing devices have become increasingly popular, with users sometimes bringing their personal computing devices to the workplace and using their personal computing devices for work. Such use can result in situations in which data files for work are stored on the user's personal computing device. While this can be helpful for users, it is not without its problems. One such problem is that companies typically like to maintain some control over their data files because these data files can oftentimes include confidential information.

In order to control their confidential information, many companies require that a device indicates that it supports certain standards or protocols in order to be sent corporate data. Part of those standards or protocols is that the company may send a command to wipe data, resulting in all data on the device being deleted so that the company knows that all corporate data is removed. Wipe commands can be sent at the company's discretion, such as when the user is no longer employed by the company. While such deletion can help protect the company, it can lead to frustrating user experiences because the deletion of all data from the user's device includes deleting all of the user's personal data files.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, an application programming interface (API) is exposed by an organization data protection system on a device to protect data associated with an organization. As part of the API, a first method is exposed that an application on the device can invoke to pass to the organization data protection system an identifier of data to be protected and to have the organization data protection system encrypt the data to be protected with an encryption key associated with the organization. Also as part of the API, a second method is exposed that the application on the device can invoke to pass to the organization data protection system an identifier of the organization and to have the organization data protection system delete a decryption key that is associated with the organization and that is used to decrypt the data to be protected.

In accordance with one or more aspects, an application on a device invokes a first application programming interface (API) method exposed by an organization data protection system on the device. The first API method is invoked to pass to the organization data protection system an identifier of data to be protected and to have the organization data protection system encrypt the data to be protected with an encryption key associated with an organization. The application also invokes a second API method exposed by the organization data protection system. The second API method is invoked to pass to the organization data protection system an identifier of the organization and to have the organization data protection system delete a decryption key that is associated with the organization and that is used to decrypt the data to be protected.

BRIEF DESCRIPTION OF THE DRAWINGS

The same numbers are used throughout the drawings to reference like features.

DETAILED DESCRIPTION

Figure 1:
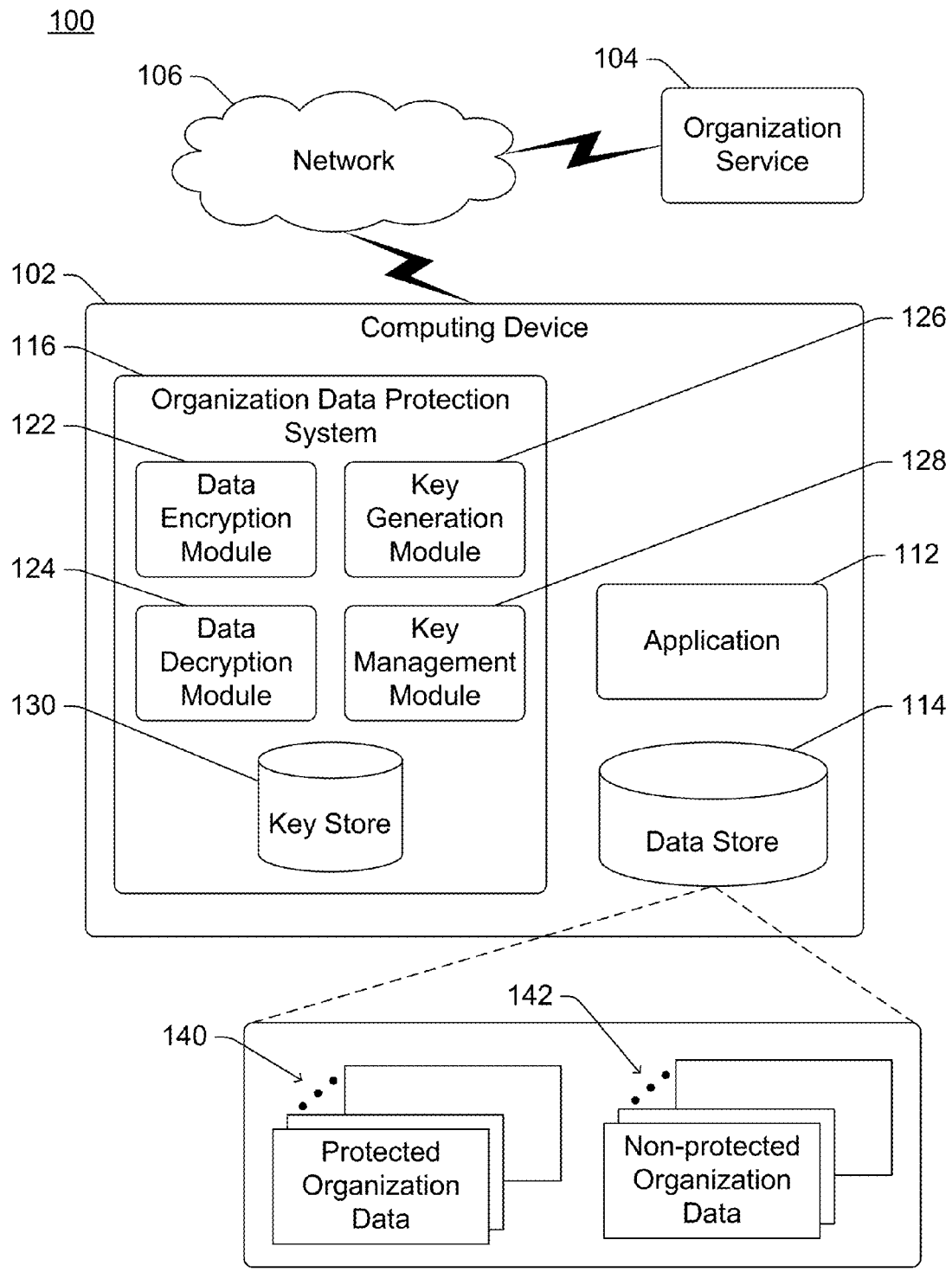
FIG. 1 illustrates an example system implementing the data protection for organizations on computing devices in accordance with one or more embodiments.

Data protection for organizations on computing devices is discussed herein. An application on a computing device can communicate with services of an organization, such as email services, file services, and so forth, and can obtain data associated with the organization (also referred to as organization data). The application accesses an organization data protection system, which encrypts organization data using an encryption key and includes with the encrypted data an indication of a decryption key that can be used to decrypt the encrypted data. The decryption key is associated with the organization, and different organizations have different decryption keys. The decryption key can optionally be associated with a user and/or application as well as the organization, so different users using the same computing device for the same organization can have different decryption keys, and the same or different users of different applications on the same computing device can have different decryption keys.

The organization data protection system maintains a record of the encryption and decryption keys associated with an organization. The organization data protection system may optionally roam the decryption keys (e.g., via a network) to multiple devices for the user that can store the organization data. The encrypted organization data can be stored in various locations on the computing device (and/or optionally one or more additional computing devices used by the user), and can be read by various applications on the computing device. When the data is subsequently read by an application, the organization data protection system attempts to obtain the decryption key indicated by the data. If the decryption key is available, the decryption key is used to decrypt the data and the decrypted data is returned to the application reading the data.

The organization can determine that organization data stored on the computing device is to no longer be accessible on the device (e.g., is to be revoked for the device). Such a determination can be made for various reasons, such as a user of the device no longer working for the organization, changes in policy, and so forth. After making such a determination, an indication is communicated by a service (e.g., of the organization or the computing device) to the computing device to revoke the data associated with the organization. In response to the indication to revoke the data associated with the organization, the organization data protection system deletes the decryption key associated with the organization from one or more of the devices associated with the user. This deletion of the decryption key is also referred to as wiping the decryption key. Subsequent requests to read the organization data will thus be unsuccessful because the decryption key is no longer available to the computing device and the data cannot be decrypted by the computing device. Other data on the computing device that is not data associated with the organization (e.g., personal data of the user of the computing device) does not use the encryption key associated with the organization, thus does not need the decryption key to decrypt the data, and thus is still accessible to the user even though the decryption key is no longer available.

FIG. 1 illustrates an example system 100 implementing the data protection for organizations on computing devices in accordance with one or more embodiments. System 100 includes a computing device 102 that can communicate with an organization service 104 via a network 106. The network 106 can be a variety of different networks, including the Internet, a local area network (LAN), a phone network, an intranet, other public and/or proprietary networks, combinations thereof, and so forth.

The computing device 102 can be a variety of different types of devices, such as a physical device or a virtual device. For example, the computing device 102 can be a physical device such as a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an automotive computer, and so forth. The computing device 102 can also be a virtual device, such as a virtual machine running on a physical device. A virtual machine can be run on any of a variety of different types of physical devices (e.g., any of the various types listed above). Thus, the computing device 102 may range from a full resource device with substantial memory and processor resources (e.g., personal computers, game consoles) to a low-resource device with limited memory and/or processing resources (e.g., traditional set-top boxes, handheld game consoles).

The organization service 104 can be implemented by one or more of a variety of different computing devices capable of providing data to the computing device 102. Similar to the discussion of the computing device 102, the servers implementing the organization service 104 can be a variety of different devices, ranging from full resource devices with substantial memory and processor resources to low-resource devices with limited memory and/or processing resources.

The organization service 104 can be a service provided by various different types of organizations, such as businesses, academic institutions, non-profit entities, and so forth. Various different types of services can be provided by an organization, such as email services, text or other messaging services, file storage or synchronization services, document authoring or management services, and so forth. The organization provides or otherwise makes available, via the organization service 104, data to the computing device. This data can be referred to as data associated with the organization, organization data, organization content, and so forth.

The computing device 102 includes an application or program 112, a data store 114, and an organization data protection system 116. The organization data protection system 116 can be implemented as part of a file system of the computing device 102, or alternatively as another application or program running on the computing device 102. The application 112 may communicate with the organization service 104 to obtain and/or update organization data, and/or may generate organization data itself. The application 112 can be, for example, an email application, a file synchronization application, a Web platform or Web application, and so forth.

The organization data protection system 116 protects organization data received at the computing device 102. As used herein, the organization data includes any information associated with an organization, such as user-entered data or program data, program instructions, binary code, and so forth. The organization data is protected by being encrypted so that it is computationally very difficult to decrypt the data without a decryption key that is related to the organization, and by allowing the decryption key to be deleted. The organization data protection system 116 includes a data encryption module 122, a data decryption module 124, a key generation module 126, a key management module 128, and a key store 130. The protection system 116 encrypts organization data in response to requests from the application 112, and decrypts organization data in response to requests from the application 112 or other applications if the decryption key associated with the organization is available.

To have organization data encrypted, the application 112 communicates a request to protect the organization data to the system 116, informing the system 116 of the organization data to be protected as well as of the organization itself. The key management module 128 maintains in the key store 130 a record of keys (e.g., encryption keys and decryption keys) that are associated with one or more organizations and that have not been wiped. The data encryption module 122 requests from the key management module 128 an encryption key associated with the organization. If an encryption key associated with the organization is included in the key store 130, then the key management module 128 returns the encryption key from the key store 130 to the data encryption module 122. However, if an encryption key associated with the organization is not included in the key store 130, then the key management module 128 communicates a request to the key generation module 126 to generate one or more keys. Different keys are generated for different organizations, and furthermore different keys can be generated for the same organization (e.g., such as for different applications, for different users, etc.) as discussed in more detail below. The generated one or more keys are returned to the key management module 128, which records the keys in the key store 130 as associated with the organization. The key management module 128 also returns the generated encryption key to the data encryption module 122.

The key generation module 126 can generate keys using any of a variety of public and/or proprietary techniques. The key generation module 126 can generate public/private key pairs associated with an organization, in which case the public key of the public/private key pair is the encryption key and the private key of the public/private key pair is the decryption key. Alternatively or additionally, the key generation module 126 can generate symmetric keys associated with an organization, in which case the symmetric key can be both the encryption key and the decryption key, or portions (e.g., certain bits) of the symmetric key can be the encryption key while other portions (e.g., other bits) of the symmetric key can be the decryption key. The keys can be generated in various manners, such as randomly or pseudo-randomly, based on particular values (e.g., based on a password of the user used to log into the device and/or a network of the organization), and so forth. The keys can be maintained at the computing device at which they are generated, or alternatively can be roamed to other computing devices.

The data encryption module 122 can return the encrypted organization data to the application 112 along with an indicator of a decryption key for the encrypted organization data for the application 112 to store the encrypted organization data and the indicator of the decryption key in the data store 114, or alternatively the data encryption module 122 can update the data store 114 directly with the encrypted organization data and the indicator of the decryption key. The data store 114 includes one or more data storage devices for the computing device 102, such as Flash memory disks, magnetic disks, optical discs, random access memory (RAM), combinations thereof, and so forth. The data storage devices can be fixed or removable devices, and can be included as part of the computing device 102 or coupled to the computing device 102. The encrypted organization data is illustrated as protected organization data 140, and can be stored in any of a variety of different manners. The encrypted organization data can be stored in the data store 114 along with data that is not encrypted organization data, illustrated as non-protected organization data 142.

The encrypted organization data stored in the data store 114 can subsequently be accessed by the application 112 as well as other applications or programs running on the computing device 102. The encrypted organization data stored in the data store 114 can optionally be accessed by other applications or programs running on other computing devices (e.g., other computer devices remotely accessing the computing device 102, other computing devices to which keys and data are roamed, etc.). The access can include reading the encrypted organization data. To read the encrypted organization data, the application desiring to read the data provides an indication of the encrypted data and optionally an indication of the decryption key to the organization data protection system 116. An indication of the decryption key can be associated with the encrypted organization data itself (e.g., in metadata for the encrypted data as discussed in more detail below). The data decryption module 124 checks the key store 130 to determine whether the indicated decryption key is included in the key store 130. If the indicated decryption key is included in the key store 130, then the data decryption module 124 retrieves the decryption key from the key store 130, decrypts the encrypted organization data, and returns the decrypted data to the requesting application. However, if the indicated decryption key is not included in the key store 130, then the data decryption module 124 returns an indication to the requesting application that the data cannot be decrypted.

In one or more embodiments, authorization to have organization data encrypted using an encryption key or decrypted using a decryption key can be gated (e.g., restricted) based on various different criteria or system conditions, such as who is logged in to the computing device or network, which application is requesting the data be encrypted or decrypted, health of the device or system, and so forth. For example, the organization data protection system 116 may restrict decryption to being performed for the same application as the encryption was performed (effectively gating access to the decryption key to the same application as encryption key access was permitted). By way of another example, the system 116 may restrict decryption to being performed for the same user as the encryption was performed (effectively gating access to the decryption key to the same user as encryption key access was permitted).

The organization data protection system 116 can optionally implement various additional policies in determining whether a key can be generated or accessed when requested. For example, the organization data protection system 116 can have a policy indicating the computing device 102 is to have a specific configuration or operating environment in order to have a key generated (or used for encryption or decryption), and these policies can apply to the user currently logged into the computing device and/or particular other users of the computing device. By way of another example, the organization data protection system 116 can have a policy indicating that the computing device 102 is to have a specific configuration or operating environment regardless of the user of the computing device. The system 116 can thus determine which user or group of users on a computing device should satisfy which policies regarding key generation and/or access.

The organization service 104 can determine that data of the organization stored on the computing device 102 is to no longer be accessible on the device, such as if the user is no longer employed by the organization. After making such a determination, the organization service 104 or other service of the organization provides a command to the computing device 102 to revoke for the computing device 102 data associated with the organization. The command can be provided by the organization service 104 to the computing device 102 via application 112, or alternatively to other components or modules of the computing device 102. Revoking organization data for a computing device refers to the organization data no longer being accessible on the computing device (e.g., no longer being readable by the application 112). Additionally or alternatively, the application 112 can decide to revoke data associated with the organization for the computing device 102 independently of the organization service 104 (e.g., in the absence of a command from the organization service 104 to revoke the data associated with the organization). Thus, the command to revoke the data associated with the organization can effectively be generated by the application 112 itself.

The key management module 128 is informed (e.g., by the application 112) of the command to revoke the data associated with the organization, and in response to being informed of the command the key management module 128 deletes from the key store 130 the keys associated with the organization. The deleted keys can be all keys associated with the organization, just keys associated with the organization and the application 112, just keys associated with the organization and the application 112 and a particular user of the computing device 102, and so forth as discussed in more detail below.

After the keys associated with the organization have been deleted from the key store 130, the keys are no longer available to the data decryption module 124 to decrypt encrypted data associated with the organization. Thus, although the encrypted data associated with the organization may not have been deleted from the computing device 102, the data is encrypted and is not accessible to applications running on the computing device and thus has been effectively revoked on the computing device 102. Because the keys associated with the organization have been deleted from the key store 130, no actions taken by a user or administrator of the device can circumvent the data having been revoked.

Although the key store 130 is illustrated as being included in the computing device 102, alternatively the key store 130 can be implemented at least in part elsewhere. For example, the key store 130 may be situated in one or more other computing devices accessed via the network 106, virtualized to a server, duplicated across one or more other computing devices, combinations thereof, and so forth.

The organization data can take a variety of different forms. In one or more embodiments, the organization data is a file. Alternatively, the organization data can take other forms, such as a folder or directory, a file container (e.g., storing compressed files), a logical binary object, a database entry, and so forth. In the case of a folder or directory, an attribute of the folder or directory can be set to indicate that any data subsequently stored in that folder or directory (and/or already stored in that folder or directory) is to be encrypted. Files or other data subsequently stored in such a folder or directory are encrypted by the data encryption module 122 as a result of their being placed in such a folder or directory (no explicit request to encrypt the file or other data need be made by the application 112—the storing of the file or data in the folder or directory can be an implicit request to encrypt the file or data).

Figure 2:
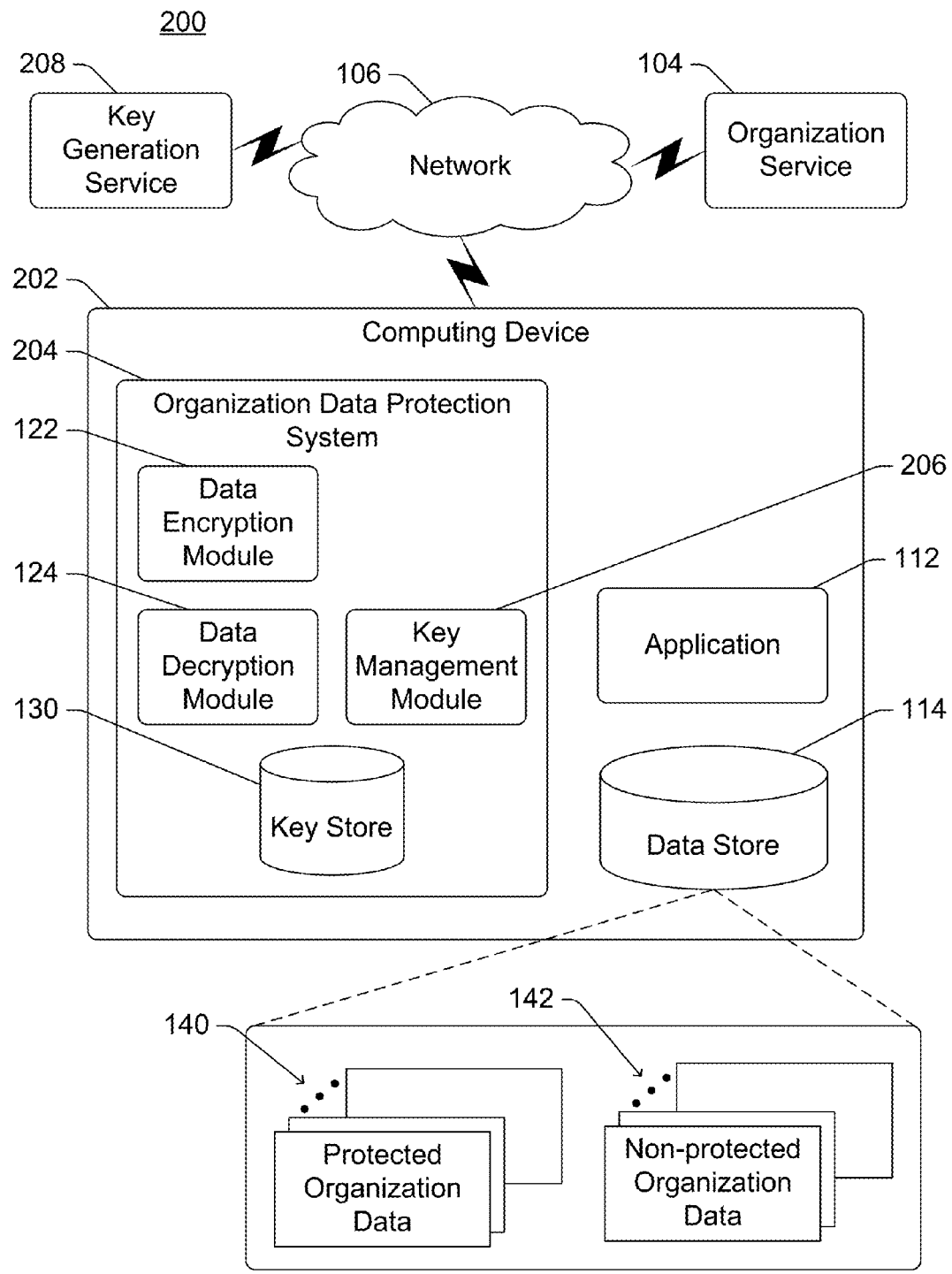
FIG. 2 illustrates another example system implementing the data protection for organizations on computing devices in accordance with one or more embodiments.

FIG. 2 illustrates an example system 200 implementing the data protection for organizations on computing devices in accordance with one or more embodiments. The system 200 is similar to the system 100, including a computing device 202, an organization service 104, and a network 106. The system 200 operates analogous to the system 100, except that the system 200 differs from the system 100 in that the computing device 202 includes an organization data protection system 204 having a key management module 206, and the system 200 includes a key generation service 208 that is separate from the computing device 202 and is accessed by the computing device 202 via the network 106 rather than being a module that is included as part of the computing device 102 as illustrated in FIG. 1.

In the system 200, key management module 206 communicates a request to the key generation service 208 to generate one or more keys. The generated one or more keys are returned to the key management module 206, which records the keys in the key store 130 as associated with the organization. If the one or more keys are requested by the key management module 206 in response to a request for an encryption key from the data encryption module 124, then the key management module 206 also returns the generated encryption key to the data encryption module 122.

The keys can be stored in the key store 130 of the organization data protection system 204 for various amounts of time. In one or more embodiments, the keys have an associated lifespan. The lifespan can be identified by an expiration time such as a specific date and/or time after which the key is no longer usable, or can be a particular duration (e.g., a particular number of hours or days after the key is received from the key generation service 208, a particular number of hours or days after the user is logged into the organization, for as long as particular health or security parameters of the computing device or operating environment are satisfied, etc.). After the lifespan for a key elapses, the key management module 206 deletes the key from the key store 130 or otherwise renders the key unusable. Thus, the keys in the key store 130 can be temporary in nature, being available for a limited amount of time to encrypt and decrypt organization data.

The key management module 206 can request keys from the key generation service 208 at various different times. In one or more embodiments, the key management module 206 requests keys in response to a request for an encryption key from the data encryption module 122. Additionally or alternatively, the key management module 206 can request keys at other times, such as in response to or as part of the computing device 202 logging into a network of the organization (e.g., a particular domain or group), in response to the application 112 accessing the organization service 104, and so forth.

In one or more embodiments, the key management module 206 requests keys from the key generation service 208 in response to or as part of the computing device 202 logging into a network of the organization. The keys have a life span of the duration of the computing device 202 being logged into the network. In response to or as part of the computing device 202 logging off the network of the organization, the key management module 206 deletes the keys from the key store 130. Thus, the organization data can be decrypted while the computing device 202 is logged into the network, but cannot be decrypted after the computing device 202 is logged off the network.

The key generation service 208 maintains a record of keys provided to the key management module 206 of the computing device 202 (e.g., in a key store of the organization). When the key management module 206 requests a key from the key generation service 208, the service 208 determines whether a key has previously been generated and provided to the module 206 of the device 202. If a key has not been previously generated and provided to the module 206 of the device 202, then the key generation service 208 generates the requested key and provides the key to the module 206. However, if a key has been previously generated and provided to the module 206 of the device 202, then the key generation service 208 retrieves the previously provided key and again provides that key to the module 206 of the device 202. Thus, organization data previously encrypted and stored on the computing device 202 can be subsequently decrypted due to the previously provided key being available from the key generation service 208.

The key generation service 208 can maintain a record of keys provided to the key management module 206 of the computing device 202 in a variety of different manners. In one or more embodiments, when a key is requested by the key management module 206, the module 206 provides an indication of the computing device 202 (and optionally provides additional information, such as an indication of the application 112 for which the key is being requested) to the key generation service 208. The service 208 can maintain a record of these indications along with the key generated in response to a request from the key management module 206, allowing the service 208 to maintain and provide to the key management module 206 different keys for different computing devices 202 (and optionally different applications on the same computing device 202).

Similarly, an indication of a user of the computing device 202 can be provided to the key generation service 208 (optionally along with an indication of the computing device 202 and/or the application 112). The service 208 can maintain a record of these indications along with the key generated in response to a request from the key management module 206, allowing the service 208 to maintain and provide to the key management module 206 different keys for different users of the computing device, and optionally for different user with different combinations of computing devices 202 and/or applications 112.

The key generation service 208 can optionally implement various additional policies in determining whether to provide a key to the key management module 206 when requested. For example, the key generation service 208 can have a policy indicating the computing device 202 is to have a specific configuration or operating environment in order to be provided a key, and these policies can apply to the user currently logged into the computing device and/or particular users of the computing device. By way of another example, the key generation service 208 can have a policy indicating that the computing device 202 is to have a specific configuration or operating environment regardless of the user of the computing device.

In the discussions of FIGS. 1 and 2, the organization service 104 is discussed as being accessed via a network. Alternatively, the organization service 104 can be implemented at least in part by the computing device 102 of FIG. 1 or the computing device 202 of FIG. 2. For example, the organization service 104 can be a Mobile Device Management (MDM) client implemented on a computing device 102 or 202 configured to issue a command to revoke the data associated with the organization when a management relationship ends. In such situations, the command to revoke the data associated with the organization can be provided by the part of the organization service implemented on the computing device regardless of whether the computing device has network connectivity.

Figure 3:
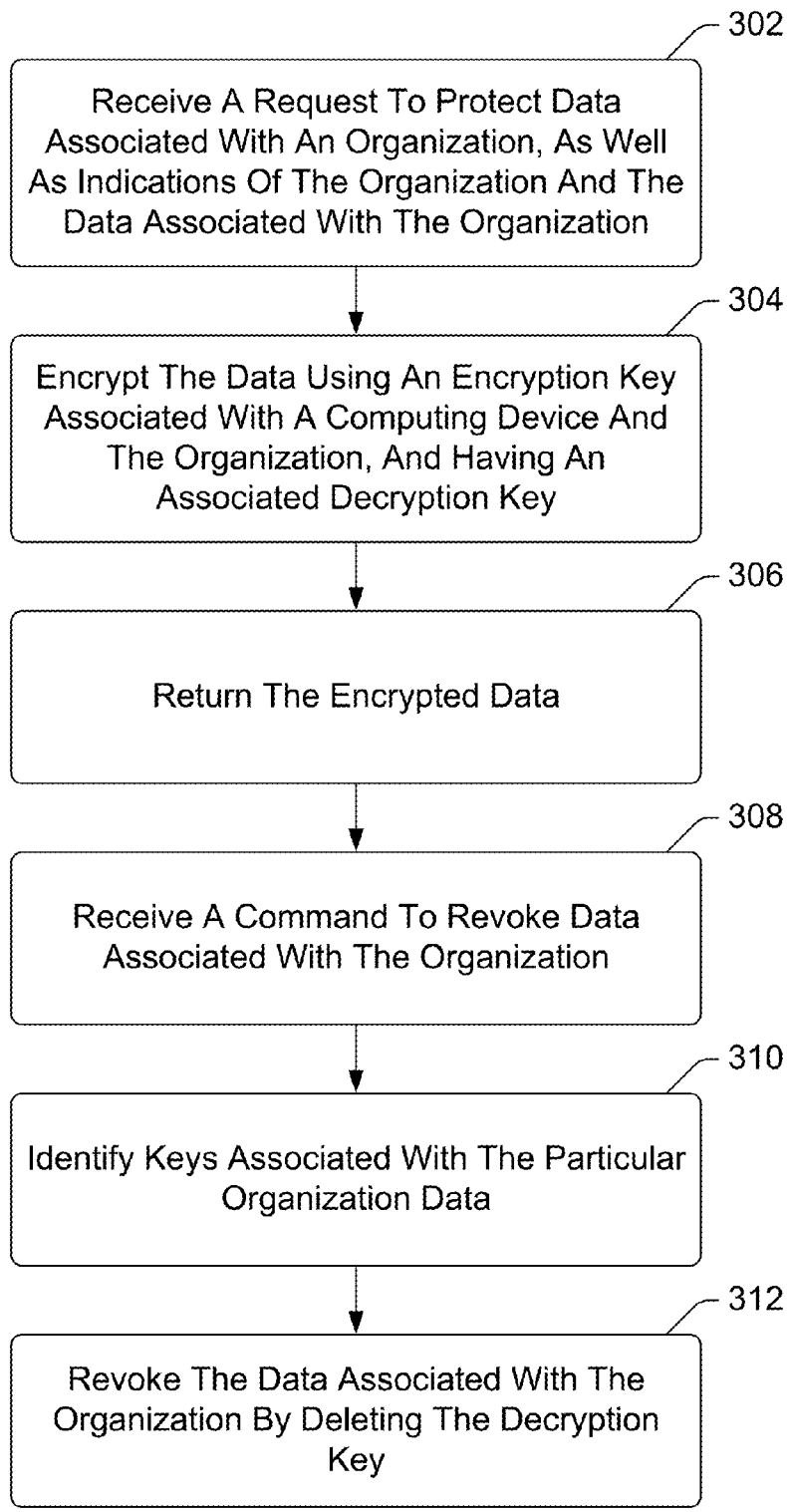
FIG. 3 is a flowchart illustrating an example process for implementing the data protection for organizations on computing devices in accordance with one or more embodiments.

FIG. 3 is a flowchart illustrating an example process 300 for implementing the data protection for organizations on computing devices in accordance with one or more embodiments. The process 300 is carried out by an organization data protection system, such as the system 116 of FIG. 1 or the system 204 of FIG. 2, and can be implemented in software, firmware, hardware, or combinations thereof. The process 300 is shown as a set of acts and is not limited to the order shown for performing the operations of the various acts. The process 300 is an example process for implementing the data protection for organizations on computing devices; additional discussions of implementing the data protection for organizations on computing devices are included herein with reference to different figures.

In the process 300, a request to protect data associated with an organization is received (act 302). The request is received from an application, such as the application 112 of FIG. 1 or 2. Associated with the request are both an indication of the organization and an indication of the data to be protected. Each of the indications can be provided in a variety of different manners. In one or more embodiments, the indication of the organization is an identifier of the organization that is provided as a parameter associated with the request, and the indication of the data to be protected is a location of the data provided as a parameter associated with the request. The identifier of the organization can be, for example, a domain name or group name of the organization, or various other strings of characters that distinguish the organization from other organizations. The identifier of the organization can be obtained from various sources, such as the organization service 104, from an email address (e.g., the email address of the user for the organization), and so forth. The identifier of the data can be, for example, a file name or various other strings of characters that distinguish the data from other data.

The indications can alternatively be provided in other manners. For example, the indication of the organization can be an identifier of other data associated with the organization. The organization data protection system identifies the organization associated with the other data, and uses that identified organization as the organization associated with the data indicated in the request. By way of another example, an indication of the organization can be obtained from another component or module, such as an operating system module that is aware of the domain or group that the computing device is logged into.

Alternatively, one or both of the indications can be inherent in the request. For example, an identifier of the data or the data itself can be stored at a known location (e.g., in memory or on a storage device) and the organization data protection system can access that known location to identify or obtain the data to be protected. By way of another example, an identifier of the organization can be stored at a known location (e.g., in memory or on a storage device) and the organization data protection system can access that known location to obtain the identifier of the organization.

The data is protected in response to a request to protect the data, and the request to protect the data can be received at various times and in response to a variety of different events. In one or more embodiments, the application requesting that the data be protected determines when the request to protect the data is made. The request can be made by the application at various times, such as when the data is received from the organization service, when the data is to be saved to a location that is not a location used and otherwise protected by the application (e.g., a different folder or directory), at times of light system usage (e.g., less than a threshold amount of processing capacity is being used, storage device usage being less than a threshold amount, etc.), in response to a policy change for the organization, when the data is to be saved to a particular location (e.g., a particular folder or directory) of the computing device, and so forth.

The data is encrypted using an encryption key that is associated with both a computing device and with the organization (act 304). The encryption can be performed using any of a variety of public and/or proprietary techniques, including public key encryption and/or symmetric key encryption techniques. The encryption key also has an associated decryption key. The encryption key can be a public key of a public/private key pair and the decryption key can be a private key of the public/private key pair, or the encryption key and the decryption key can be the same key (or different parts of the same key) as discussed above. An encryption key and associated decryption key, if not previously generated, can also be generated in act 304.

In one or more embodiments, the organization data protection system on the computing device generates the encryption key and thus the encryption key is associated with the computing device on which the encryption key is generated. Alternatively, the encryption key can be generated on another device, and an indication of the computing device associated with the encryption key provided to the other device as discussed above.

The encryption key is associated with a particular protection identifier. The protection identifier can be an identifier of the organization, in which case all organization data associated with the same organization is associated with the same decryption key. Alternatively, the protection identifier can be based on various information in addition to the identifier of the organization, allowing organization data to be separated into different subsets each of which is associated with a different decryption key. By separating organization data into different subsets, different subsets can be revoked as desired. Even though organization data may be separated into different subsets, multiple subsets can be grouped together and managed as a single subset if desired (e.g., as indicated by the organization).

The protection identifier can include various different information, such as an identifier of the application that requested that the data be protected, an identifier of a current user of the computing device (a user logged into the computing device when the request to protect the data is made), and so forth. The protection identifier can also include other information, such as characteristics of the application that requested that the data be protected, claims that the application that requested that the data be protected makes (e.g., policy with which the application conforms), and so forth. The protection identifier can combine the various information in different manners, such as by concatenating the information or applying other rules or criteria to determining how to combine the information.

In situations where the encryption key is based on information in addition to the identifier of the organization, indications of such information can be provided to the organization data protection module in a variety of different manners. For example, indications of such information can be provided using any of the various techniques discussed above with reference to the indications of data and organizations.

As discussed above, the key store 130 maintains a record of keys (e.g., encryption keys and decryption keys) that are associated with one or more organizations. The keys are associated with the protection identifier, which is based at least in part on the organization identifier. A record of the keys and associated organization data can be maintained in the key store 130 in a variety of different manners. In one or more embodiments, a list or other data structure maps the keys to the protection identifiers and vice versa. Alternatively, an association between encrypted data and decryption keys can be maintained in other manners, such as a list or other data structure that maps data identifiers (e.g., file names) to keys.

In one or more embodiments, the keys are stored as part of a user profile of a current user of the computing device (e.g., the user logged into the computing device running the application 112). Different records of keys are maintained for different users, so the keys are inherently associated with a particular user. Alternatively, the keys can be stored in a manner allowing sharing across user profiles, resulting in organization data that is protected based on the same keys for multiple users.

The encrypted data is returned (act 306). The encrypted data can be returned in a variety of different manners. In one or more embodiments, the encrypted data itself or an identifier of the encrypted data is returned to the requester (e.g., the application 112) that requested protection of the data. Alternatively, the encrypted data can be returned in other manners, such as being stored in a location at which the requester expects the encrypted data to be stored or knows to look for the encrypted data.

It should be noted that the encrypted data is returned in the absence of any restrictions on where the encrypted data can be stored by the application 112 or other applications. The encrypted data can be stored in and transferred to various different folders, directories, devices, and so forth.

Figure 4:
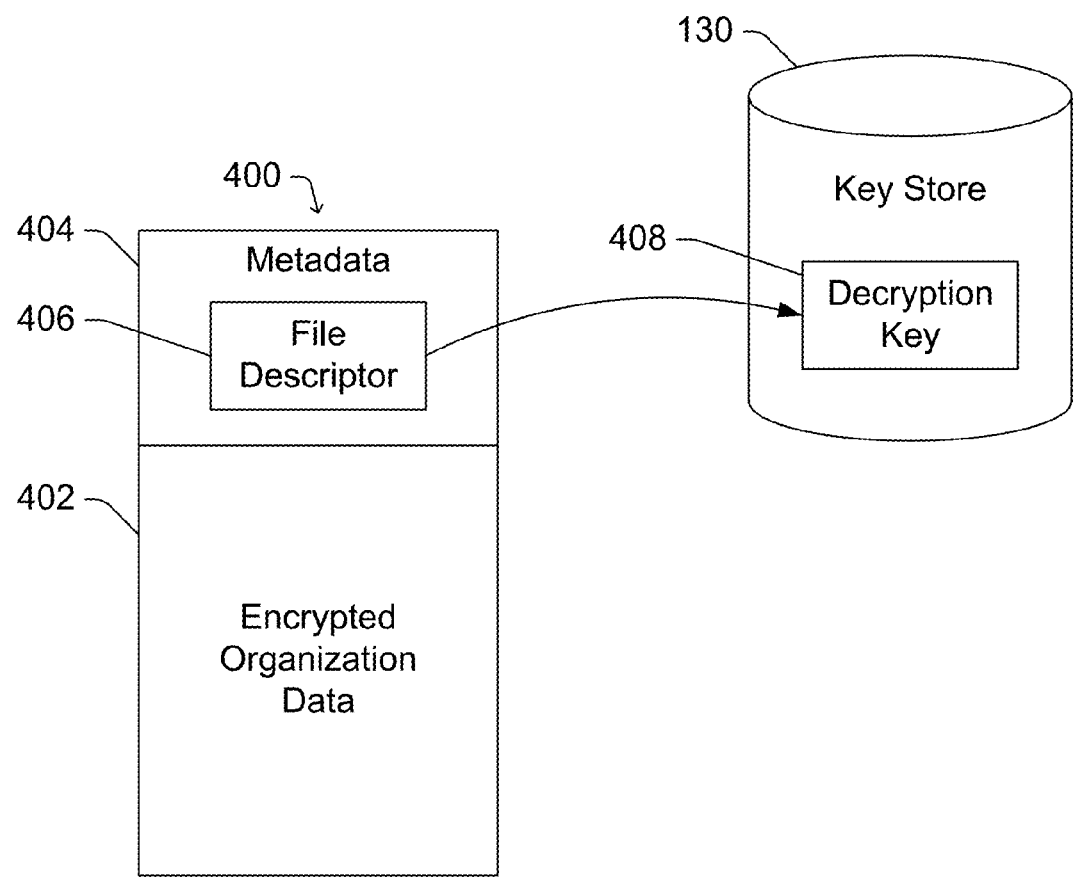
FIG. 4 illustrates an example of encrypted data in accordance with one or more embodiments.

In one or more embodiments, the encrypted data has associated metadata that includes a descriptor that identifies the decryption key to be used to decrypt the encrypted data. FIG. 4 illustrates an example of encrypted data 400 in accordance with one or more embodiments. The encrypted data 400 includes organization data 402 (which is encrypted) and metadata 404. The metadata 404 (which may not be encrypted) includes a file descriptor 406 that is an identifier of a decryption key 408 in the key store 130. The identifier can be a name or other string of characters allowing different decryption keys to be distinguished from one another, a memory or storage location, and so forth. In response to a request to decrypt the organization data 402, the file descriptor 406 is accessed to identify the decryption key 408, which can be used to decrypt the content.

Returning to FIG. 3, a command to revoke the data associated with the organization is received (act 308). The command to revoke the data is an indication that data associated with the organization is to no longer be accessible on the computing device. This command can be received after organization data has been encrypted (e.g., after one or more files have been encrypted). The command to revoke the data can be received in response to any of a variety of different events. For example, the command to revoke the data can be received in response to the user no longer being employed by or working with the organization, the computing device on which the organization data is stored logging off a network of the organization, a determination being made (e.g., by a service of the organization) that the computing device on which the organization data is stored is no longer secure, and so forth.

The command to revoke the data associated with the organization includes an indication of particular organization data to be revoked, allowing the appropriate protection identifier to be determined. The indication of the particular organization data can be inherent in the command to revoke the data (e.g., if all the organization data is associated with the same protection identifier, then the command to revoke the data from the organization inherently indicates all of the organization data). The indication of the particular organization data can also be explicitly identified, identifying the information to be used to identify the organization data that is to be revoked (e.g., identifying the information from which the protection identifier can be determined).

In one or more embodiments, the command to revoke the data associated with the organization is received by the application 112 from the organization service 104. In response, the application 112 provides a command to the key management module 128 to revoke the data associated with the organization. Organization data can be associated with different protection identifiers based on various information as discussed above. The indication received in act 308 can include an indication of the protection identifier. Thus, the command received in act 308 can specify particular organization data to be revoked, including all organization data or optionally a subset of the organization data. The command provided by the application 112 to the key management module 128 can similarly include an indication of the protection identifier, allowing the application to specify particular organization data (e.g., organization data associated with the application) to be revoked.

One or more keys associated with the organization data are identified (act 310). Organization data can be associated with different protection identifiers based on various information as discussed above. The one or more keys associated with the protection identifier received (or generated in) act 308 are identified in act 310.

The data associated with the organization is revoked by deleting or wiping the decryption key associated with the organization (act 312). The decryption key is included in the one or more keys associated with the organization data (e.g., the one or more keys associated with the protection identifier received or generated in act 308). Other keys may also be included in the one or more keys associated with the organization data, such as an encryption key. In deleting the decryption key associated with the organization, the encrypted data need not be deleted because it is rendered no longer accessible (e.g., unreadable) due to the decryption data not being available. The organization data protection system can optionally delete organization data itself at various times, such as in response to a request from another component or module, in response to a determination of light system usage (e.g., less than a threshold amount of processing capacity is being used, storage device usage being less than a threshold amount, etc.), and so forth. Encrypted data to be deleted can be determined in different manners, such as by evaluating the metadata of files to identify files including a file descriptor identifying a decryption key that is no longer present in the key store 130.

It should be noted that although keys associated with the organization (e.g., the one or more keys associated with the protection identifier received or generated in act 308) are deleted in act 312, keys associated with other organizations (e.g., other protection identifiers) are not deleted. Thus, some keys are deleted in act 312 while leaving in the key store other decryption keys that are associated with organization data that is associated with other organizations, or decryption keys that are associated with other subsets of organization data other than that identified by the protection identifier in act 308.

In one or more embodiments, after a decryption key is deleted the decryption key is not regenerated, resulting in the organization data encrypted using the corresponding encryption key not being subsequently readable. Alternatively, in some situations a record of the keys can be maintained, such as by key generation service 208 in system 200 of FIG. 2. In such situations, keys can be deleted from the key store 130, and subsequently added back into the key store 130 (e.g., and identified in the same manner so that the file descriptors in the metadata of the encrypted data files identify the same key). Thus, in such situations data for a deleted key can be subsequently readable if the decryption key can be subsequently obtained (e.g., due to the user again logging into a network of the organization or being re-hired by the organization).

In one or more embodiments, the key management module 128 associates keys with both the organization and the application from which the request to protect the organization data is received. Thus, different applications obtaining organization data from the same organization have the organization data encrypted with different encryption keys (and decrypted with different decryption keys). The key management module 128 deletes a key associated with organization data and a particular application in response to a command from that particular application to delete the key. An indication from another application to delete the key is ignored by the key management module 128. Thus, groups or subsets of organization data associated with the same organization (but different applications) can be revoked separately from one another.

Alternatively, some applications on the computing device 102 may be considered to be more privileged, and the ability to revoke organization data from one application can be delegated to such a more privileged application. The ability to revoke all organization data associated with an application can be delegated to another application, or alternatively the ability to revoke only particular organization data (e.g., particular subsets associated with particular protection identifiers) can be delegated to another application. For example, an email application can be designated a more privileged application, and key management module 128 can revoke organization data for multiple applications (e.g., all of the applications on the computing device 102) in response to a command to revoke organization data from the email application. The key management module 128 can identify which applications are able to revoke organization data associated with other applications in different manners, such as by requesting an identification of such other applications from another component or module of the computing device 102, being configured with criteria to use in determining whether an application can revoke data associated with another application (e.g., based on a type or class of application), receiving an indication of applications that are able to revoke organization data associated with other applications from an administrator of the computing device or as a policy to be implemented by the device, receiving an indication of applications that are able to revoke organization data associated with other applications from one or more of the applications, and so forth. It should be noted that an application to which the ability to revoke organization data is delegated is an application that is able to receive and understand the revoke command.

It should also be noted that although the techniques discussed herein store the decryption keys associated with organization data on a computing device, the decryption keys can optionally be permitted to roam to different computing devices. By allowing the decryption keys to roam to different computing devices, the organization data encrypted at one computing device can be decrypted at another device. Thus, the organization data can roam to different computing devices and remain accessible to users on those different devices. Decryption keys can roam to different computing devices in a variety of different manners. In one or more embodiments, the decryption keys are associated with a particular user account and stored on (e.g., copied to) a remote service (e.g., accessed via the network 106). Any computing device that is used to log into that particular user account has access to the decryption keys, allowing such computing device to decrypt the organization data.

When roaming the decryption keys, organization data can be revoked on other computing devices in various manners, such as by maintaining a record of computing devices that were used to log into a particular user account and provide a command to those computing devices to revoke data associated with the organization (in response to which such computing devices delete any decryption keys they are storing that are associated with the organization). Alternatively, the decryption keys may only be accessible to a computing device when a user is logged into the particular user account, and when a command to revoke data associated with the organization is received at one computing device, the command is roamed to the other computing devices from which a user may log into that particular user account. Alternatively, the organization may desire to revoke data on some devices but not others. In such situations, the organization can provide an indication of the particular devices on which the organization data is to be revoked, and the key management module on a device deletes the one or more keys associated with the organization on that device only if that device is one of the particular devices indicated by the organization.

In one or more embodiments, the organization data protection system (e.g., system 116 of FIG. 1 or system 204 of FIG. 2) exposes an application programming interface (API) supporting the techniques discussed herein. The API includes various methods that can be invoked by the application 112 to have various aspects of the techniques discussed herein performed. In one or more embodiments, the API includes four methods: a protect method, a copy protection method, a revoke method, and a get status method.

Figure 5:
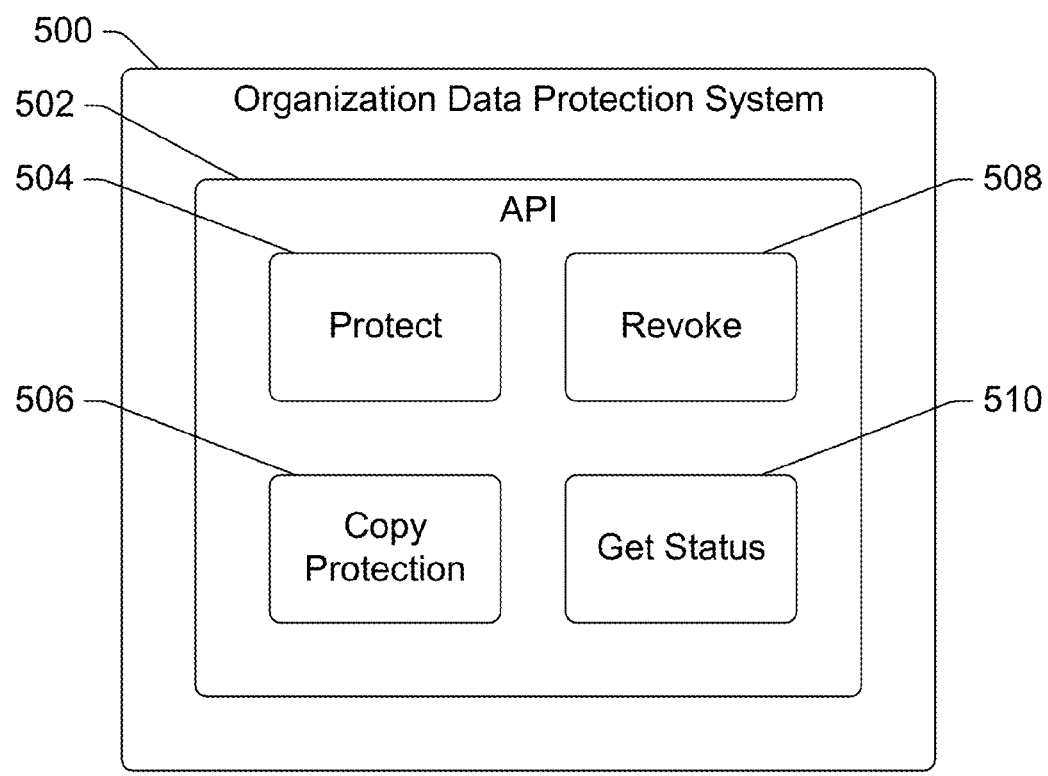
FIG. 5 illustrates an example organization data protection system in accordance with one or more embodiments.

FIG. 5 illustrates an organization data protection system 500 in accordance with one or more embodiments. The organization data protection system 500 can be, for example, the organization data protection system 116 of FIG. 1 or the organization data protection system 204 of FIG. 2. The organization data protection system 500 makes available (exposes) an API 502 including a protect method 504, a copy protection method 506, a revoke method 508, and a get status method 510. These methods of the API 502 can be exposed by various modules of the system 500 (e.g., the key management module, the data encryption module, etc.), and can be invoked by an application 112 to carry various aspects of the techniques discussed herein.

In the discussion of the API 502, various different protection statuses of data are discussed. These different protection statuses include: unprotected, revoked, protected, protected by another user, protected by another organization, not protectable, and undetermined. The unprotected status indicates that the data is not, and has not been previously, protected (is not encrypted) by the system 500. The revoked status indicates that the data has been protected in the past and the decryption key is currently unavailable (e.g., was deleted as part of calling the revoke method 508). The protected status indicates that the data is currently protected by the current user. The protected by another user status indicates that the data was previously protected by another user on the computing device. The protected by another organization indicates that the data was previously protected by and associated with another organization (e.g., another protection identifier). The not protectable status indicates that the data cannot be protected for the organization. The undetermined status indicates that the system 500 cannot determine the protection status of the data.

The status of data can be identified by the organization data protection system 500 in a variety of different manners. In one or more embodiments, metadata associated with data includes the status of the data and/or other information from which the status can be determined. For example, if the metadata includes a file descriptor identifying a decryption key associated with the user, then the system 500 can determine the status of the data is protected. If the metadata includes a file descriptor identifying a decryption key associated with another user, then the system 500 can determine that the status of the data is protected by another user. If the metadata includes a file descriptor identifying a decryption key associated with another organization (e.g., another protection identifier), then the system 500 can determine that the status of the data is protected by another organization. If the metadata includes a file descriptor identifying a decryption key associated with an organization and the current user, and the key has been deleted from the key store 130, then the system 500 can determine that the status of the data is revoked. If the metadata includes no file descriptor identifying a decryption key, then the system 500 can determine that the status of the data is unprotected. If the metadata indicates that the data is a particular type of data (e.g., a system file, a read-only folder, etc.) then the system 500 can determine that the status of the data is not protectable.

The protect method 504 has as parameters a storage item parameter and an organization identifier parameter. The storage item parameter takes as input an identifier (e.g., filename) of data to be protected, and the organization identifier parameter takes as input an identifier of the organization (e.g., a protection identifier) for which the data is to be protected. The application 112 invokes the protect method 504, providing the identifier of the data to be protected and the identifier of the organization for which the data is to be protected as parameters.

In response to the protect method 504 being invoked, the organization data protection system 500 determines whether the data can be protected for the organization. If the data can be protected for the organization then the data is encrypted with the encryption key associated with the identified organization (e.g., the protection identifier). If the data cannot be protected for the organization, then the data is not encrypted. The organization data protection system 500 can use various policy, rules, or other criteria to determine whether the data can be protected for the organization. For example, the organization data protection system 500 may determine that the data is not to be protected because the data is already protected by another user, the data is already protected for another organization, protection of data associated with the organization has been revoked (e.g., the data was already encrypted and the decryption key revoked, so the application is to obtain the data again if the application desires to have the data protected), the data is already protected for the organization, the data cannot be encrypted (e.g., is a read only file or folder), the data is already being encrypted or decrypted (e.g., the application is to request to have the data protected again at a later time), and so forth. The organization data protection system 500 optionally returns an indication to the application 112 of the status of the data after invoking the protect method 504.

Table I illustrates an example of actions that can be taken by the organization data protection system 500 in response to the protect method 504 being invoked. It should be noted that the actions of Table I are examples, and that not all of the actions in Table I may be taken and/or additional actions may be taken. Other embodiments may choose to return more, different, or less information to the calling application 112, or even no information at all (e.g., to get the status of the data the application 112 can use the get status method 510 after the attempt to protect).

TABLE I

| Data status prior to method being invoked | Action |
| --- | --- |
| Unprotected | Encrypt data; return status indicating data is protected. |
| Protected by another user | Do not encrypt data; return status indicating data is protected by another user. |
| Protected to another organization | Do not encrypt data; return status indicating data is protected to another organization. |
| Revoked | Do not encrypt data; return status indicating protection is revoked. |
| Protected (to same organization) | Do not encrypt data; return status indicating data is protected. |
| Not protectable (e.g., System file, compressed file, read-only folder, non-empty folder, protected under legacy system) | Do not encrypt data; return status indicating the data is not protectable. |
| Currently being encrypted or decrypted | Do not encrypt data; return status indicating ability to protect data is undetermined. |

Although the protect method 504 is discussed with reference to having two parameters, it should be noted that the protect method 504 can include optionally one or more additional parameters if the data is to be protected based on other information (e.g., user identifier, application identifier, and so forth). These additional parameters may be explicitly passed, or implicitly determined by the organization data protection system.

The copy protection method 506 has as parameters a source data parameter and a target data parameter. The target data parameter takes as input an identifier (e.g., a filename) of data to be protected (referred to as the target data), and the source data parameter takes as input an identifier (e.g., a filename) of data the protection of which is to be copied (referred to as the source data). The copy protection method 506 attempts to apply the protection of the source data to the target data, and returns a value indicating whether the attempt was successful (e.g., a value of True indicating the attempt was successful, and a value of False indicating the attempt was unsuccessful).

The copy protection method 506 allows the application 112 to request that the target data be encrypted with the key associated with the organization (e.g., the protection identifier) with which the source data is encrypted. The application 112 need have no knowledge of the organization (e.g., the protection identifier), but simply requests that the target data be encrypted so as to be included in the same subset of organization data as the source data. If the target data can be encrypted with the key associated with the organization (e.g., the protection identifier) with which the source data is encrypted, then the target data is protected (encrypted) with the encryption key associated with the key associated with the organization (e.g., the protection identifier) with which the source data is encrypted. If the target data parameter cannot be encrypted with the key associated with the organization (e.g., the protection identifier) with which the source data is encrypted, then the target data parameter is not encrypted.

Table II illustrates an example of whether the organization data protection system 500 is successful in its attempt to copy the protection of the source data to the target data in response to the copy protection method 506 being invoked. It should be noted that the results of Table II are examples based on various conditions, and that results for different conditions can alternatively be used. Moreover, other embodiments may choose to return different information to the calling application 112, or even no information at all (e.g., to get the status of the data the application 112 can use the get status method 510 after the attempt to copy protection).

TABLE II

| Source data protection | Target data protection prior to method being invoked | Target data protection after method is invoked | Return |
|---|---|---|---|
| Unprotected | Unprotected | Unprotected | True |
| Unprotected | Anything except Unprotected | Unchanged | False |
| Revoked | Anything | Unchanged | False |
| Protected by another user | Anything | Unchanged | False |
| Not protectable | Anything | Unchanged | False |
| Protected | Unprotected | Protected | True |
| Protected to one organization identifier | Protected to a different organization identifier than the source data | Unchanged | False |
| Protected to one organization identifier | Protected to the same organization identifier as the source data | Protected | True |

TABLE II-continued

| Source data protection | Target data protection prior to method being invoked | Target data protection after method is invoked | Return |
|---|---|---|---|
| Anything | Protected by another user | Protected by another user | False |
| Anything | Revoked | Unchanged | False |
| Anything | Not protectable | Unchanged | False |

The revoke method 508 has as parameters an organization identifier parameter. The organization identifier parameter takes as input an identifier of the organization (e.g., a protection identifier) for which organization data is to no longer be accessible on the computing device. The application 112 invokes the revoke method 508, providing the organization identifier. In response to the revoke method 508 being invoked, the organization data protection system 500 deletes the decryption key (and encryption key if separate from the decryption key) associated with the organization identifier. The revoke method can optionally return a value indicating whether the revocation was successful (e.g., a value of True indicating the revocation was successful (the decryption key was deleted), and a value of False indicating the revocation was unsuccessful (the decryption key was not deleted)). Alternatively, additional information could be returned (such as if there are multiple keys associated with the organization and the revoke deleted one, some, all, or none), no status could be returned, and so forth.

The get status method 510 has as parameters a storage item parameter. The storage item parameter takes as input an identifier (e.g., filename) of data, or alternatively an actual copy of data (e.g., a binary object), for which the status (e.g., whether the data has been revoked) is desired. The application 112 invokes the get status method 510, providing the identifier of the data for which an indication of whether the data has been revoked is desired. In response to the get status method 510 being invoked, the organization data protection system 500 determines the status of the identified data and can return an indication of whether the data has been revoked. For example, if such an indication is returned, the get status method 510 can return one of the following values: unprotected, revoked, protected, protected by another user, and not protectable. Alternatively, no status may be returned.

The techniques discussed herein support various usage scenarios. An organization can allow users to bring their own portable devices to work and store organization data on those devices, secure in the knowledge that the organization data can be rendered inaccessible when desired by the organization without adversely affecting (e.g., while leaving accessible) the non-organization data (e.g., the user's personal data) on the computing device. Furthermore, the organization data can be stored anywhere on the computing device or transferred to one or more other computing devices—applications are not restricted to storing the organization data only in particular folders, directories, or areas under control of the application. The protection provided by the techniques discussed herein moves with the organization data, and the organization data can be allowed to be freely transferred to various locations, with the organization being secure in the knowledge that the organization data can be rendered inaccessible when desired by the organization.

Additionally, a user can have organization data for different organizations stored on his or her computing device (e.g., if the user works with two different companies). Different decryption keys are used for the different organizations, so the organization data for one of the organizations can be revoked without adversely affecting (e.g., while leaving accessible) the organization data for the other of the organizations.

Although particular functionality is discussed herein with reference to particular modules, it should be noted that the functionality of individual modules discussed herein can be separated into multiple modules, and/or at least some functionality of multiple modules can be combined into a single module. Additionally, a particular module discussed herein as performing an action includes that particular module itself performing the action, or alternatively that particular module invoking or otherwise accessing another component or module that performs the action (or performs the action in conjunction with that particular module). Thus, a particular module performing an action includes that particular module itself performing the action and/or another module invoked or otherwise accessed by that particular module performing the action.

Figure 6:
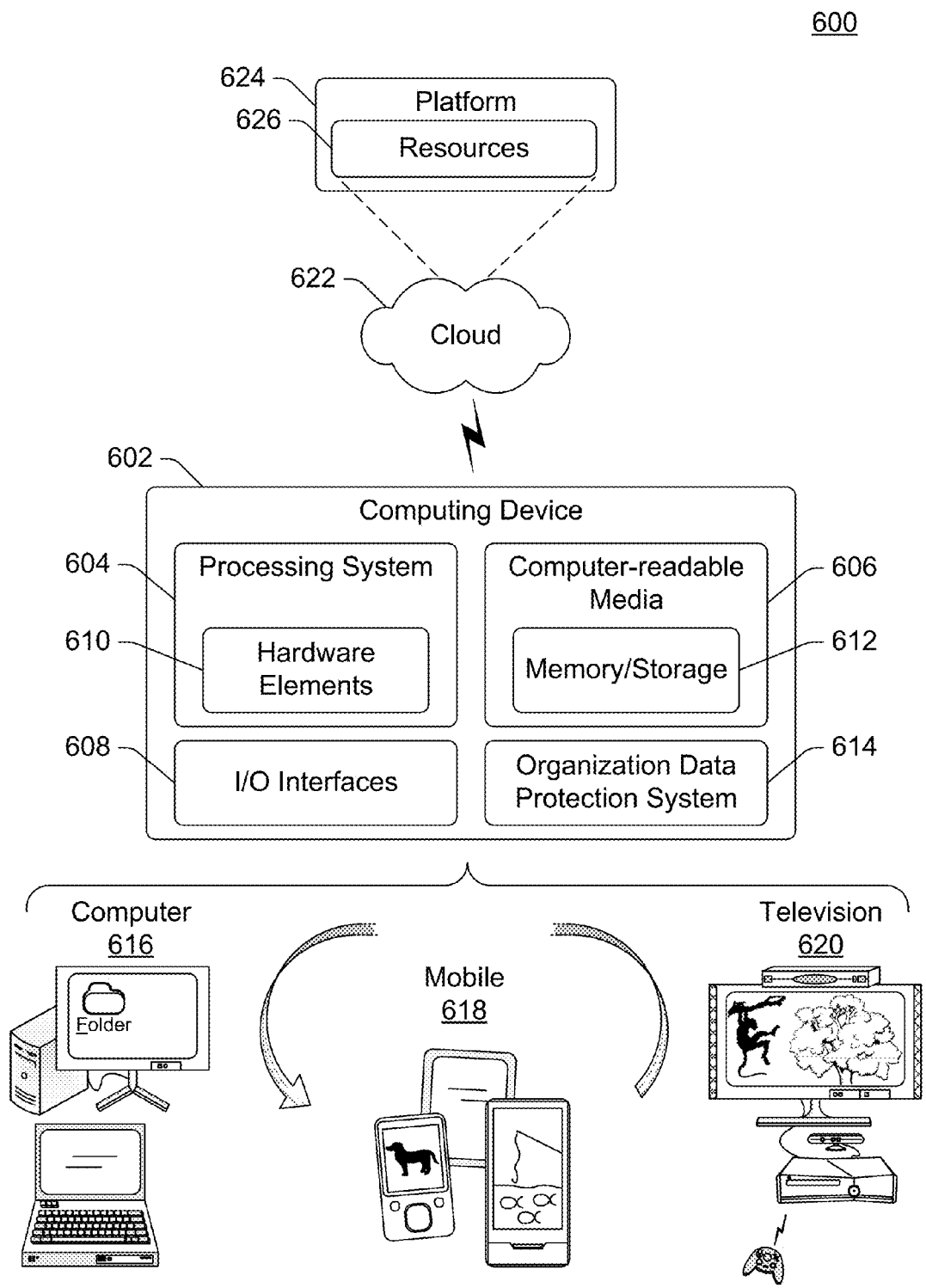
FIG. 6 illustrates an example system that includes an example computing device that is representative of one or more systems and/or devices that may implement the various techniques described herein.

FIG. 6 illustrates an example system generally at 600 that includes an example computing device 602 that is representative of one or more systems and/or devices that may implement the various techniques described herein. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O Interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 606 is illustrated as including memory/storage 612. The memory/storage 612 represents memory/storage capacity associated with one or more computer-readable media. The memory/storage 612 may include volatile media (such as random access memory (RAM)) and/or nonvolatile media (such as read only memory (ROM), Flash memory, optical disks, magnetic disks, and so forth). The memory/storage 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone (e.g., for voice inputs), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 602 may be configured in a variety of ways as further described below to support user interaction.

The computing device 602 also includes an organization data protection system 614. The organization data protection system 614 provides various data protection functionality for organization data as discussed above. The organization data protection system 614 can implement, for example, the organization data protection system 116 of FIG. 1 and/or the organization data protection system 204 of FIG. 2. The organization data protection system 614 can be implemented in software, hardware elements, program modules and so forth. For example, the system 614 can be implemented at least in part in software, in a subscriber identity module (SIM), in a smart card, in a storage device controller (e.g., a hard drive controller or solid state disk controller), and so forth.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" refers to media and/or devices that enable persistent storage of information and/or storage that is tangible, in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of modules as a module that is executable by the computing device 602 as software may be achieved at least partially in hardware, e.g., through use of computer-readable storage media and/or hardware elements 610 of the processing system. The instructions and/or functions may be executable/operable by one or more articles of manufacture (for example, one or more computing devices 602 and/or processing systems 604) to implement techniques, modules, and examples described herein.

As further illustrated in FIG. 6, the example system 600 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 600, multiple devices are interconnected through a central computing device. The central computing device may be local to the multiple devices or may be located remotely from the multiple devices. In one or more embodiments, the central computing device may be a cloud of one or more server computers that are connected to the multiple devices through a network, the Internet, or other data communication link.

In one or more embodiments, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one or more embodiments, a class of target devices is created and experiences are tailored to the generic class of devices. A class of devices may be defined by physical features, types of usage, or other common characteristics of the devices.

In various implementations, the computing device 602 may assume a variety of different configurations, such as for computer 616, mobile 618, and television 620 uses. Each of these configurations includes devices that may have generally different constructs and capabilities, and thus the computing device 602 may be configured according to one or more of the different device classes. For instance, the computing device 602 may be implemented as the computer 616 class of a device that includes a personal computer, desktop computer, a multi-screen computer, laptop computer, netbook, and so on.

The computing device 602 may also be implemented as the mobile 618 class of device that includes mobile devices, such as a mobile phone, portable music player, portable gaming device, a tablet computer, a multi-screen computer, and so on. The computing device 602 may also be implemented as the television 620 class of device that includes devices having or connected to generally larger screens in casual viewing environments. These devices include televisions, set-top boxes, gaming consoles, and so on.

The techniques described herein may be supported by these various configurations of the computing device 602 and are not limited to the specific examples of the techniques described herein. This functionality may also be implemented all or in part through use of a distributed system, such as over a "cloud" 622 via a platform 624 as described below.

The cloud 622 includes and/or is representative of a platform 624 for resources 626. The platform 624 abstracts underlying functionality of hardware (e.g., servers) and software resources of the cloud 622. The resources 626 may include applications and/or data that can be utilized while computer processing is executed on servers that are remote from the computing device 602. Resources 626 can also include services provided over the Internet and/or through a subscriber network, such as a cellular or Wi-Fi network.

The platform 624 may abstract resources and functions to connect the computing device 602 with other computing devices. The platform 624 may also serve to abstract scaling of resources to provide a corresponding level of scale to encountered demand for the resources 626 that are implemented via the platform 624. Accordingly, in an interconnected device embodiment, implementation of functionality described herein may be distributed throughout the system 600. For example, the functionality may be implemented in part on the computing device 602 as well as via the platform 624 that abstracts the functionality of the cloud 622.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method in a device, the method comprising:
exposing, by an organization data protection system on the device, an application programming interface (API) to protect data associated with an organization;
exposing, as part of the API, a first method that an application on the device can invoke to pass to the organization data protection system an identifier of data to be protected and to have the organization data protection system encrypt the data to be protected with an encryption key associated with the organization, the organization data protection system determining a data status for the data prior to the first method being invoked, the data status indicating whether the data can be protected for the organization based on one or more protection statuses contained in metadata associated with the data; and
exposing, as part of the API, a second method that the application on the device can invoke to pass to the organization data protection system an identifier of the organization and to have the organization data protection system delete a decryption key that is associated with the organization and that is used to decrypt the data to be protected.

2. A method as recited in claim 1, the data to be protected comprising a file, and the first method having a storage item parameter that takes as an input an identifier of the file.

3. A method as recited in claim 1, the first method having an organization identifier parameter that takes as an input an identifier of the organization.

4. A method as recited in claim 1, the second method having an organization identifier parameter that takes as an input the identifier of the organization.

5. A method as recited in claim 1, further comprising exposing, as part of the API, a third method that the application on the device can invoke to have the organization data protection system return an indication of whether particular data has been revoked, the particular data having been revoked indicating that the particular data has been protected in the past and that a decryption key to decrypt the particular data is unavailable.

6. A method as recited in claim 5, the particular data comprising a file, and the third method having a storage item parameter that takes as an input an identifier of the file.

7. A method as recited in claim 1, further comprising exposing, as part of the API, a third method that the application on the device can invoke to request that first data to be protected be encrypted with a key associated with an organization with which second data to be protected is encrypted.

8. A method as recited in claim 7, the third method having a target data parameter that takes as an input an identifier of the first data to be protected.

9. A method as recited in claim 7, the third method having a source data parameter that takes as an input an identifier of the second data to be protected.

10. A method as recited in claim 7, the first data to be protected comprising a first file, the second data to be protected comprising a second file, the third method having a target data parameter that takes as an input an identifier of the first file, and a source data parameter that takes as an input an identifier of the second file.

11. A method in a device, the method comprising:
invoking, by an application on the device, a first application programming interface (API) method exposed by an organization data protection system on the device to pass to the organization data protection system an identifier of data to be protected and to have the organization data protection system encrypt the data to be protected with an encryption key associated with an organization, the organization data protection system determining a data status for the data prior to the first API method being invoked, the data status indicating whether the data can be protected for the organization based on one or more protection statuses contained in metadata associated with the data; and
invoking, by the application, a second API method exposed by the organization data protection system to pass to the organization data protection system an identifier of the organization and to have the organization data protection system delete a decryption key that is associated with the organization and that is used to decrypt the data to be protected.

12. A method as recited in claim 11, the data to be protected comprising a file, and the invoking the first API method including providing an identifier of the file as a storage item parameter of the first API method.

13. A method as recited in claim 11, the invoking the first API method including providing an identifier of the organization as an organization identifier parameter of the first API method.

14. A method as recited in claim 11, the invoking the second API method including providing the identifier of the organization as an organization identifier parameter of the second API method.

15. A method as recited in claim 11, further comprising invoking, by the application, a third API method exposed by the organization data protection system to have the organization data protection system return an indication of whether particular data has been revoked, the particular data having been revoked indicating that the particular data has been protected in the past and that a decryption key to decrypt the particular data is unavailable.

16. A method as recited in claim 15, the particular data comprising a file, and invoking the third API method including providing an identifier of the file as a storage item parameter of the third API method.

17. A method as recited in claim 11, further comprising invoking, by the application, a third API method exposed by the organization data protection system to request that first data to be protected be encrypted with a key associated with an organization with which second data to be protected is encrypted.

18. A method as recited in claim 17, the invoking the third API method including providing an identifier of the first data to be protected as a target data parameter of the third API method.

19. A method as recited in claim 18, the invoking the third API method further including providing an identifier of the second data to be protected as a source data parameter of the third API method.

20. A computing device comprising:
an application; and
an organization data protection system configured to:
expose an application programming interface (API) to protect data associated with an organization;
expose, as part of the API, a first method that the application can invoke to pass to the organization data protection system an identifier of data to be protected and to have the organization data protection system encrypt the data to be protected with an encryption key associated with the organization, the organization data protection system determining a data status for the data prior to the first method being invoked, the data status indicating whether the data can be protected for the organization based on one or more protection statuses contained in metadata associated with the data;

expose, as part of the API, a second method that the application can invoke to pass to the organization data protection system an identifier of the organization and to have the organization data protection system delete a decryption key that is associated with the organization and that is used to decrypt the data to be protected, the organization data protection system determining whether the metadata associated with the data includes a file descriptor identifying the decryption key that is associated with the organization;

expose, as part of the API, a third method that the application can invoke to request that first data to be protected be encrypted with a key associated with an organization with which second data to be protected is encrypted; and expose, as part of the API, a fourth method that the application can invoke to have the organization data protection system return an indication of whether particular data has been revoked, the particular data having been revoked indicating that the particular data has been protected in the past and that a decryption key to decrypt the particular data is unavailable.

* * * * *